United States Patent [19]

Baniel

[11] 4,291,007

[45] Sep. 22, 1981

[54] PROCESS FOR THE SEPARATION OF A STRONG MINERAL ACID FROM AN AQUEOUS SOLUTION

[75] Inventor: Avraham M. Baniel, Jerusalem, Israel

[73] Assignee: Yissum Research & Development Co. of Hebrew Univ. of Jeru., Jerusalem, Israel

[21] Appl. No.: 134,918

[22] Filed: Mar. 28, 1980

[30] Foreign Application Priority Data

Apr. 9, 1979 [IL] Israel .......................................... 57024

[51] Int. Cl.$^3$ .............................................. B01D 11/09
[52] U.S. Cl. .................................. 423/390; 423/321 S; 423/488; 423/531
[58] Field of Search ...................... 423/321 S, 390, 488, 423/531, 399; 210/21

[56] References Cited

U.S. PATENT DOCUMENTS

| | | | |
|---|---|---|---|
| 3,186,809 | 6/1965 | Kreevoy et al. | 423/390 |
| 3,333,924 | 8/1967 | Hazen et al. | 423/591 X |
| 3,558,288 | 1/1971 | Burrows | 423/24 |
| 3,632,311 | 1/1972 | Kovacs et al. | 423/321 X |
| 3,911,087 | 10/1975 | Villarejos et al. | 423/321 S |

OTHER PUBLICATIONS

Bertocci et al., "J. Inorg. Nucl. Chem.," vol. 23, 1961, pp. 323–332.

*Primary Examiner*—G. O. Peters

[57] ABSTRACT

The invention provides a process for the separation of a strong mineral acid from other species present in an aqueous solution and the recovery thereof. The process comprises the steps of: (a) bringing an aqueous solution containing the mineral acid to be separated into contact with a substantially immiscible extractant phase, whereupon the mineral acid to be separated selectively and reversibly transfers to the extractant phase; (b) separating the two phases; and (c) backwashing the extractant phase with an aqueous system to recover substantially all the mineral acid contained in the extractant phase. The special extractant phase used comprises a strong organic acid which acid is oil soluble and substantially water immiscible both in free and in salt form, an oil soluble amine which amine is substantially water insoluble both in free and in salt form and a carrier solvent for the organic acid and amine, the molar ratio of the organic acid to amine in the extractant phase being between about 0.5:2 and 2:0.5.

17 Claims, No Drawings

PROCESS FOR THE SEPARATION OF A STRONG MINERAL ACID FROM AN AQUEOUS SOLUTION

The present invention relates to a process for the separation of a strong mineral acid from other species present in an aqueous solution and the recovery thereof. More particularly the present invention relates to a process for the separation of a strong mineral acid from other species present in an aqueous solution including the separation of strong mineral acids from each other using a two liquid phase extraction process involving an immiscible extractant phase.

Two phase systems comprising an aqueous phase and an immiscible phase are known in the art and used in a variety of processes of separation and of reaction. Separations can lead to concentration of a constituent present in low concentration in the aqueous phase or provide a step in the recovery of one constituent out of many initially present in an aqueous phase.

Reactions are achieved by displacing an equilibrium which exists in an aqueous phase through the selective transfer to the solvent phase of one of the species which participate in the equilibrium. In all cases the usefulness of the two phase systems resides in the ability of the solvent phase to extract selectively constituents out of the aqueous phase and such two phase systems are already known and used in the art.

In U.S. Pat. Nos. 2,894,813 and 2,902,341 acids (HX) and salts (MY) are converted to a corresponding pair of acid and salt according to the reaction $$HX + MY \rightleftharpoons MX + HY$$

by means of a solvent in which both HX and HY are soluble. Said processes illustrate how a reversible reaction is displaced via preferential extraction, however said patents do not teach or suggest a method by which strong conc. mineral acids present in an aqueous solution can be separated from each other by solvent extraction, nor do they suggest a general method having a wide range of applicability.

An important feature of the present invention is that it now makes it possible to carry out a wide range of mineral acid extractions without the necessity of devising a particular extraction technique for each extraction and irrespective of whether the acid to be extracted is initially present in the system or only formed during a reaction wherein the extraction serves to shift the reaction equilibrium in the desired direction.

The behavior of strong acids, particularly mineral acids, toward many solvents is described extensively in the prior art.

Oxygenated solvents, e.g., alcohols, ketones, ethers, esters, etc. have been widely used but their usefulness is limited by the following considerations:

(a) At low acidity levels distribution coefficients strongly favor the aqueous phase which entails the use of large volumes of solvents relative to volumes of aqueous phases;

(b) At higher acidity levels the miscibility of solvents with water increases sharply until complete miscibility is reached. This depresses efficiencies and imposes upper operational limits; and (c) Selectivity between acids greatly diminishes with concentration thus imposing operation limitations if separation need be achieved.

As illustration, when preparing $KNO_3$ by the processes described in U.S. Pat. Nos. 2,894,813 and 2,902,341 quoted above, the separation of HCl from $HNO_3$ takes place at a level below 2 N in $H^+$. If one considers that commercial nitric acid is about 15 N in $H^+$ ions, the loss of concentration imposed by the solvent becomes obvious.

The ability of long chain aliphatic amines to complex inorganic and organic acids was first reported by E. L. Smith and J. E. Page (J. Soc. Chem. Ind. Vol. 67, 48 (1948)). They noted that long chain aliphatic amines, dissolved in an appropriate solvent, will extract strong acids quantitatively from aqueous solutions, and that strong acids can be extracted from mixtures containing weak acids.

In 1956 K. A. Allen (J. Phys. Chem. 60 239, 49) reported the presence of amine sulfate and bisulfate salts in organic solvents in the investigation of the distribution coefficient between tri-n-octylamine and sulfuric acid.

Coleman et al [J. Ind. Eng. Chem. 50 1756 (1958)] through an extensive program on the recovery of uranium from acid leach liquors, contributed directly to the first large scale commercial application of the amine extraction (AMEX) process. These workers recognized the analogy between extraction with liquid amine systems and solid weak base ion exchange resins, and were aware of the advantages of a hydraulic, continuous system in commercial processing. Additional advantages proved to be the case with which the selectivity of an extractant could be altered by varying the amine structure, and the organic diluent to meet the requirements of various applications.

During the uranium process development work, various organo-nitrogen compounds were screened as possible extractants. Of those screened, the simple amines (both branched and straight chained primary, secondary and tertiary amines) in the 250–600 molecular weight range performed best. Subsequent work demonstrated that from the standpoint of aqueous solubility of the amines and their salts, organic solubility, phase separation, ratio of ionic capacity to weight, and availability-cost considerations, the branched secondary and symmetrical tertiary amines had the greatest potential as commercial extractants.

Thus, basic solvents such as primary, secondary, tertiary and quaternary amines have been found to be very efficient in extracting acids since they form stable salts with strong acids. They are also selective. The order of selectivity is generally illustrated by the (incomplete) sequence $$HClO_4 > HNO_3 > HCl > HBr > H_2SO_4 > H_3PO_4.$$

However, the extraction is practically irreversible. Though reversibility may be obtained in specific systems and under special conditions such as described in Israel Pat. No. 39710 wherein hydrolysing with water at higher temperatures is required, in fact, strong acids are recovered only at low concentrations.

Amine salts, generally the salt of an amine with a strong mineral acid, e.g., an amine phosphate, have been proposed as solvents for use in a few cases, e.g., in U.S. Pat. No. 3,458,282. Contrary to amines, they do provide for reversible distribution at fairly high acidity levels but their poor selectivity and poor definition in many component systems strongly limits their usefulness.

Thus an amine-salt in the presence of an aqueous acid identical to that of the salt, and at high concentrations (several times normal at least) is capable of extracting the acid. The amounts in excess of stochiometric are reversibly extracted.

The use of this phenomenom in the purification of acids by extraction was proposed but has found little if any practical use since the following limitations were found to apply.

(a) Only very concentrated acids can be extracted and the extraction is never complete.

(b) Contaminants that have anions with greater affinity to amine than the extracted acid will accumulate in the extractant and degrade it, e.g., $SO_4^{--}$ will replace $PO_4^{---}$ so that an amine phosphate proposed for the upgrading of wet process phosphoric acid needs periodic regeneration by alkali (see U.S. Pat. No. 3,458,282).

(c) Reversibility is back to the mono-amino salt but not to the free amine; and (d) Separation between two strong acids is rarely feasible in view of the equilibrium established when acids decompose amine salts, e.g.,

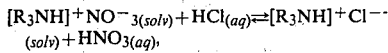

the equilibrium being determined by the affinity of the acids involved with respect to the amine and their overall relative proportions.

Thus, if one would want to remove a minor proportion of $HNO_3$ from a major proportion of HCl, at a low acidity level, such as 2 N, amine-salts virtually fail to act as extractants. At a high acidity level the amine will tend to form the nitrate but the high proportion of HCl to $HNO_3$ will result in the coextraction of both acids since selectivity over stoichiometric proportions is poor.

Furthermore, if one were to try to extract an acid A with an amine salt of acid B, the extractant phase would contain amine salts of acids A and B. In back extracting one might well recover the wrong acid. Similarly the amine salt of a mineral acid in a system of two or more mineral acids because of the above phenomena tends to lose its identity and its consequent recoverability and reusability thereby complicating the controlability of processes involving amine salts.

In contradistinction to said prior art processes and the disadvantages inherent therein, the present invention provides a process for the separation of a strong mineral acid from other species present in an aqueous solution and the recovery thereof comprising the steps of:

(a) bringing an aqueous solution containing said mineral acid to be separated into contact with a substantially immiscible extractant phase, said extractant phase comprising:
 (1) a strong organic acid which acid is oil soluble and substantially water immiscible both in free and in salt form;
 (2) an oil soluble amine which amine is substantially water insoluble both in free and in salt form; and
 (3) a carrier solvent for said organic acid and said amine, wherein the molar ratio of said organic acid to said amine is between about 0.5:2 and 2:0.5,
whereupon said predetermined mineral acid selectively and reversibly transfers to said extractant phase;

(b) separating said two phases; and (c) backwashing said extractant phase with an aqueous system to recover substantially all the mineral acid contained in said extractant phase.

One of the advantages of the present invention in its preferred embodiments is that the invention also provides a process for the separation of strong mineral acids present in an aqueous solution from each other and the recovery thereof comprising the steps of:

(a) bringing an aqueous solution containing said mineral acids to be separated into contact with a substantially immiscible extractant phase, said extractant phase comprising:
 (1) a strong organic acid which acid is oil soluble and substantially water immiscible both in free and in salt form;
 (2) an oil soluble amine which amine is substantially water insoluble both in free and in salt form; and
 (3) a carrier solvent for said organic acid and said amine, wherein the molar ratio of said organic acid to said amine is between about 0.5:2 and 2:0.5,
whereupon a first predetermined mineral acid selectively and reversibly transfers to said extractant phase and a second predetermined mineral acid remains in said aqueous phase;

(b) separating said two phases; and (c) backwashing said extractant phase with an aqueous system to recover substantially all the mineral acid contained in said extractant phase.

The novel extractant phase system of the present invention is fundamentally different from any of said prior art solvent systems and is differentiated by the fact that the strong acid present is organic and is held captively in association with the amine in the solvent phase. This results, inter alia, in the following improved results:

(a) The solvent is regenerable by extraction with water. Whatever the equilibria, it was made to participate in, the identity and proportion of the active constituents remains unchanged;

(b) Acids in the whole range of concentrations distribute between aqueous and solvent phases. There is no limitation on concentration of acids to be extracted; and (c) the novel solvents are as selective to acids as the amines they contain. This permits selective recoveries and separations between acids.

The strong organic acids envisioned for use in the extractant phase of the present invention are organic acids which may be defined and characterized as follows: When 1 mol of the acid in a 0.2 molar or higher concentration is contacted with an equivalent amount of 1 N NaCl, the pH of the sodium chloride solution decreases to below 3.

Especially preferred are strong organic acids selected from the group consisting of aliphatic and aromatic sulfonic acids and alpha-, beta- and gamma-chloro and bromo substituted carboxylic acids, e.g., hexadecylsulfonic acid, didodecylnaphthalene sulfonic acid, dinonylnaphthalene sulfonic acid, didodecylnaphthalene disulfonic acid, alpha-bromo lauric acid, beta-, beta-dichloro decanoic acid and gamma dibromo octanoic acid, etc.

The amines of the present invention are preferably primary, secondary and tertiary amines singly or in mixtures and characterized by having at least 10 and preferably at least fourteen carbon atoms and at least one hydrophobic group. Such commercially available amines as Primene JM-5, and Primene JM-T (which are primary aliphatic amines in which the nitrogen atom is bonded directly to a tertiary carbon atom) and which commercial amines are sold by Rohm and Haas Chemical Co., Amberlite LA-1 and Amberlite LA-2, which are secondary amines sold by Rohm and Haas, Alamine 336, a tertiary tricaprylyl amine (TCA) sold by General Mills and Alamine 304, a tertiary trilaurylamine (TLA) sold by General Mills, Inc. can be used in the processes of the present invention, as well as other well known and available amines including, e.g., those secondary and tertiary amines listed in U.S. Pat. No. 3,458,282.

The carrier solvents can be chosen from a wide range of organic liquids known to men skilled in the art which can serve as solvents for said acid-amine active components and which provide for greater ease in handling and extracting control. Said carrier solvents can be unsubstituted or substituted hydrocarbon solvents in which the organic acid and amine are known to be soluble and which are substantially water insoluble, e.g., kerosene, mineral spirits, naphtha, benzene, xylene, toluene, nitrobenzene, carbon tetrachloride, chloroform, trichloroethylene, etc. Also higher oxygenated compounds such as alcohols, ketones, esters, ethers, etc. that may confer better homogeneity and fluidity and others that are not acids or amines but which may confer an operationally useful characteristic can also be included.

The processes according to the present invention have many commercial applications as described hereinafter and as will suggest themselves to men skilled in the art in light of the present invention, and enable the carrying out of many processes in which a reaction results in an aqueous solution containing a mineral reagent acid of the reaction as well as a mineral product acid of said reaction. According to the present invention such an aqueous solution is brought into contact with said substantially immiscible extractant phase to effect the separation of said acids whereafter said separated reagent acid can optionally be recovered and recycled, e.g., (a) hydrochloric acid may be selectively extracted from an aqueous solution containing hydrochloric acid and sulfuric acid;

(b) hydrochloric acid may be selectively extracted from an aqueous solution containing hydrochloric acid and phosphoric acid; and (c) nitric acid may be selectively extracted from an aqueous solution containing nitric acid and hydrochloric acid.

A simple example of the importance and applicability of the process of the present invention to commercially important processes is its utility for the recovery of $KNO_3$ from the reaction of $KCl$ and $HNO_3$ by contacting an aqueous filtrate of said reaction consisting essentially of nitric acid and hydrochloric acid with the presently proposed extractant phase to selectively transfer said nitric acid to said extractant phase, separating said two phases and backwashing said extractant phase with an aqueous solution to recover for recycling substantially all of the originally extracted nitric acid.

In the presently proposed process the essential operating extractant is believed to be the amine balanced by a substantially equivalent amount of strong organic acid. An excess of acid acts as a modifier of the system, and so does an excess of amine which obviously will be present as salts of acids present in the system. These modifiers are useful in optimisation of the extractant but not essential.

Thus, as stated, the molar ratio between the two foregoing active constituents lies between 0.5 to 2 and 2 to 0.5 and preferably between about 0.5 to 1 and 1 to 0.5.

As will be realized, strong mineral acids distribute reversibly between aqueous solution and these novel extractants. This permits the recovery of strong acids from aqueous solutions at concentrations approaching those in the original solution by a sequence of countercurrent contacting of the aqueous solution with the extractant followed by the countercurrent contacting of the loaded extractant with water.

Further these novel extractants retain the essential selectivities of the amine they contain. This permits effective separations between acids.

Further yet the character of these extractants is such that they never become miscible with water whatever the level of acidity in the aqueous phase with which they equilibrate. This provides for efficient selective reversible separations between acids at high concentration levels with the separated acids being recovered at substantially the same high levels. Such separations were in most cases heretofore beyond the capabilities of the art of solvent extraction.

While the invention will now be described in connection with certain preferred embodiments in the following examples, it will be understood that it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to the most useful and readily understood description of procedures as well as of the principles and conceptual aspects of the invention.

EXAMPLE 1

5 ml of a 0.4 N solution of a tertiary trilaurylamine (TLA) (Sold by General Mills, Inc. as Alamine 304) in xylene was mixed with 5.5 ml of a 0.4 N solution of dinonylnaphthalene sulfonic acid (HDNNS), obtained by adjusting SYNEX DN-052 of King Industries, Inc. with the addition of xylene. The homogenous organic phase that was obtained was equilibrated with gentle agitation with 2 ml 1 N $HNO_3$. After settling, separation and analysis, it was established that the aqueous phase was 0.64 N in $HNO_3$.

The organic phase was then equilibrated with 2 ml of $H_2O$. After separation the acidity in the aqueous phase was 0.27 N.

With two more successive equilibrations with 2 ml of $H_2O$ each, the combined aqueous phases were found to contain practically the full 2 meqs of $HNO_3$ originally contained in the 2 ml 1 N $HNO_3$.

The organic phase was again loaded with $HNO_3$ by equilibration with 2 ml 1 N $HNO_3$, then washed with successive portions of 2 ml $H_2O$. Within the accuracy of the experimental conditions, the same concentrations in the successive aqueous phases were obtained as previously.

It is thus obvious that the combination of TLA: HDNNS in equivalent ratios of 1:1.1 acted with respect to $HNO_3$ as a reversible extractant.

COMPARATIVE EXAMPLE 1a 5 ml of a 0.4 N solution of trilaurylamine (TLA) in xylene were equilibrated with gentle agitation with 2 ml of $HNO_3$ 1 N. After settling the aqueous layer was separated and titrated with 0.1 N NaOH. One drop rendered the solution pink to phenolphthalein.

The organic phase was again equilibrated with 2 ml of water. After separation the aqueous phase was found by titration to contain practically no free acidity.

It is evident that 2 meqs of TLA contained in the organic phase extracted the 2 meqs of $HNO_3$ irreversibly under the conditions of the experiment.

EXAMPLE 2

0.4 N solutions of TLA and of HDNNS were mixed in equal volumes (5 ml and 5 ml) so as to obtain an equivalent ratio of 1:1. The mixture was equilibrated with 2 ml 1 N $HNO_3$, separated and equilibrated with 2 ml of $H_2O$. The results are compared to those of Example 1 in the table below:

|  | TLA:HDNNS | meq/ml of $H^+$ in aqueous phase | |
|---|---|---|---|
|  |  | 1st equilibration | 2 equilibration |
| Ex. 1 | 1:1.1 | 0.64 | 0.27 |
| Ex. 2 | 1:1 | 0.42 | 0.20 |

With a further two washings with $H_2O$, 2 ml each, virtually the total $HNO_3$ was recovered as in Example 1.

It is obvious that the change in ratio between the amine and the organic acid does not change the essential character and ability of the extractant to extract the acid reversibly, though it modulates the equilibrium. This ability to modulate provides for possibilities of optimising processes conceived for specific cases of extraction of acids.

EXAMPLE 3

A 50% solution of commercial didodecylnaphthalene sulfonic acid HDDNS (Synex DD-052 by King Industries, Inc. U.S.) was diluted with xylene and n-dodecanol to obtain a solution containing 9% by weight of xylene and 36% by weight of dodecanol. This solution was mixed with a 0.4 N solution of TLA in xylene in approximately 1.24 to 1.00 by volume to obtain a clear extractant solution containing 0.2 eqs/ml of HDDNS and 0.18 eqs/ml of TLA. 18.75 ml of extractant were equilibrated with 1 ml of 4.05 N $HNO_3$. After separation the aqueous phase contained 3.53 meq/ml. The organic phase was then equilibrated with 20 ml of $H_2O$. After separation the aqueous phase was analyzed. Practically the total amount of extracted $HNO_3$ was recovered.

Equilibration is thus observed at a relatively high acidity level of 4 N with the solvent capacity in terms of the TLA contained utilized to about 15% only. This indicates the feasibility of reversible distributions even at higher acidity levels by adjustment of extractant compositions, e.g., in the present case mainly by adding a high proportion of n-dodecanol as an auxiliary constituent in the carrier solvent.

EXAMPLE 4

A 20 ml solution containing 0.2 meq/ml HDNNS and 0.4 meq/ml tricaprylylamine $N(C_6H_{17})_3$(TCA) (manufactured by General Mills Inc.) (ratio HDNNS:TCA=0.5:1) in Nopar 12 was prepared. It was mixed with 5 ml of a 80:20 solution of n-dodecanol:xylene to ensure homogenity. The resulting extractant solution was equilibrated with 10 ml of 1.75 N $HNO_3$. The organic phase was then equilibrated with 20 ml of $H_2O$. After separation the aqueous phase contained 0.2 meq $H^+$/ml. The organic phase was equilibrated again with 10 ml of 1.75 $HNO_3$. 4 meq of $HNO_3$ were extracted. After another equilibration with 20 ml of $H_2O$ the aqueous solution contained 0.2 meq $H^+$/ml.

It is observed that reversible distribution obtains even in the presence of a large excess of amine. The presence of the free amine does not interfere with the reversible recovery of acid by aqueous extraction.

For comparison purposes a solution similar to the above but containing no HDNNS was checked for extraction of 1.75 N $HNO_3$. It was found that $HNO_3$ in an amount equivalent to TCA was irreversible extracted (as in comparative example 1a).

EXAMPLE 5

Solutions containing various proportions of HDNNS and TCA in Nopar 12 were tested. At each ratio equilibrations were performed with $HNO_3$ of various concentrations and with $H_2O$. By analysing the aqueous phase, its equilibrium concentration was determined. By keeping account of acidities abstracted from aqueous phases and rejected, the loading of the TCA by acid for each equilibrium could be calculated. Though these calculations depended on differences and lack accuracy they provide a valid approximation to characteristic distributions for the extractants used.

Results obtained in this experiment are summarized
Results obtained in this experiment are summarized in the following tables:

| HDNNS:TCA | Distributions | | | | | | |
|---|---|---|---|---|---|---|---|
|  | 0.4:1 | | 0.51:1 | | 1:1 | | |
| Equilibrium aq. phase meq/ml | 0.156 | 0.253 | 1.20 | 1.30 | 1.75 | 2.75 | 3.7 |
| Amine loading % of total TCA | 84 | 75 | 80 | 83 | 87 | 40 | 52 |
| % of "free" TCA* | 140 | 153 | 163 | 169 | 178 | — | — |

*Free amine meaning the amine in excess of the stochiometric amount of acid.

From the above table it is possible to see the effect on distribution caused by changes in the ratio of amine to organic acid and changes in the acid concentration.

EXAMPLE 6

An extractant as in example 4 with a HDNNS:TCA ratio of 1:1 was equilibrated with various concentrations of aqueous hydrochloric acid. Typical results are tabulated below:

| Equilibrium concentration of HCl in meq/ml | 4.0 | 7.6 |
|---|---|---|
| Loading of TCA % | 23 | 70 |

By equilibrating with $H_2O$ in an amount equal to the amount of the extractant all the acid was recovered. It is seen that hydrochloric acid is reversibly extracted similarly to nitric acid though to a considerably lesser extent under comparable conditions.

EXAMPLE 7

The selectivity of the extractant of 1:1 ratio of the previous example with respect to $HNO_3$ over HCl was confirmed by equilibrations with mixtures of the two acids as illustrated below:

| Equilibrium aqueous phase | | |
|---|---|---|
| meq HCl/ml | 5.3 | 6.75 |
| meq HNO$_3$/ml | 1.2 | 1.35 |
| meq H$^+$/ml | 6.5 | 8.10 |
| HCl:HNO$_3$ equivalents ratio | 1:0.23 | 1:0.2 |
| Loading of TCA in solvent % | 72 | 92 |
| HCl:HNO$_3$ ratio in solvent | 1:1 | 1:1.1 |

The selectivity appears to hold for very high levels of acidity.

EXAMPLE 8

A Process for Potassium Nitrate

The usefulness of the extractants for strong acids may be illustrated by a process in which KCl and HNO$_3$ are efficiently converted to KNO$_3$ and HCl.

To a recycle liquor containing 62–64 grs HNO$_3$, 10–12 grs HCl, 3 grs KNO$_3$ and 145–147 grs H$_2$O, the following were added under agitation and cooling: 76–78 grs KCl and 97 grs HNO$_3$ of 65%. In 10 to 20 minutes at −5° C. to +5° C. the reaction is complete. The slurry is filtered under suction and the filtrate collected then washed with 20 ml ice-cold water. About 1 mol of KNO$_3$ (101 grs) is obtained of excellent purity and of uniform crystal size.

The filtrate which contains product HCl, excess HNO$_3$ and some K$^+$ is extracted by an extractant containing 2.15 equivalents of HDNNS and 2.15 equivalents of TCA in 4,000 to 6,000 ml Nopar 12 in three countercurrent stages. The aqueous residue contains approximately 1 mole of HCl (36.5 grs) in 18% to 20% HCl by weight. This hydrochloric acid also contains 1.5 to 3.5 grs KCl representing a loss of 2 to 5% of KCl. Any sodium which was present in the potash also is found in this aqueous phase. This acid is sufficiently pure for many uses and can be redistilled if necessary.

The solvent loaded with HNO$_3$ and some HCl was then contacted countercurrently with the wash solution obtained above and with 125 to 127 ml of water. Three to five countercurrent stages are used with the water fed to the ultimate stage (at which the regenerated extractant exits) and the wash solution fed to the penultimate stage or the next one. In this operation the extractant is regenerated and the recycle liquor for the next cycle is formed.

Alternatively prior to the combination of the filtrate with said extractant, the extractant is charged with 50 ml. HCl 32% by weight and then the extraction is carried out in three countercurrent stages as described. In said alternative route the aqueous residue is found to contain HCl in about 30% to 32% HCl by weight and about 1 gr of KCl per 1 mol of HCl representing a loss of less than 2% KCl. It can thus be seen that the charging of the extractant with HCl prior to extraction results in the presence of HCl in higher concentration in said aqueous solution or residue with less impurities and a smaller loss of KCl.

When said charging is effected in the presence of a salt having a common anion with HCl i.e., KCl in this reaction, the utilization of HCl in the charging is enhanced:

EXAMPLE 9

20 ml of homogenous extractant solution was prepared containing 0.25 meq/ml primene JM-T (tertiary alkyl, primary amine manufactured by Rohm & Haas) and 0.25 meq/ml HDNNS in organic free white spirits.

This solution was used in two series of tests. In series A the extractant was equilibrated with HCl solutions of different concentrations. In series B it was equilibrated with the same solutions which were previously saturated with KCl. In each test the extractant was equilibrated again with 10 ml water and the aqueous phase was analysed.

| meq H$^+$ in 1 ml aqueous phase | | | | |
|---|---|---|---|---|
| 1st equilibration | 10 | 7 | 4 | 1 |
| 2nd equilibration series A | 0.2 | 0.13 | 0.07 | 0.013 |
| 2nd equilibration series B | 0.25 | 0.16 | 0.08 | 0.027 |

From the above it can be seen that an extractant equilibrated with KCl saturated HCl solutions for use in the process of the present invention was loaded with HCl to a higher level.

As is known potassium nitrate has become in the last 12 years a recognized quality fertilizer. The potassium and nitrogen it provides are immediately available to plants and are not accompanied by ballast constituents such as calcium or chloride. In fact the very absence of the latter is an important quality of this fertilizer.

The major supplier of potassium nitrate in Israel today is Haifa Chemicals Ltd. They started in 1967 with a nominal capacity of 100,000 TPY and have doubled it two years ago to 200,000 TPY.

Haifa Chemical exploits a process based on solvent extraction in which dilute hydrochloric acid is obtained as a coproduct. It is then concentrated and used in the manufacture of phosphoric acid.

While the process of the present invention is also solvent-based, it is radically different and presents advantages of compactness, simplicity and energy savings. In particular, the coproduct hydrochloric acid is obtained directly as concentrated (about 32%) acid suitable for many uses, e.g., petroleum wells.

It is clear from the examples given that the fertilizer values contained in the feeds namely K in KCl and N in HNO$_3$ are fully recovered in the product KNO$_3$. On the other hand chloride values which are an undesirable ballast in fertilizer are recovered as useful hydrochloric acid.

Many other conversions of salts with strong acids can be accomplished by the present process parallel to the conversions that are recognized to be accomplishable with amines with the major difference however that these are achieved under reversible conditions which obviates the consumption of chemicals for regeneration. By way of illustration, products attainable from NaCl and KCl which have industrial outlets are listed below.

| Acid | Product | Uses |
|---|---|---|
| H$_3$PO$_4$ | NaH$_2$PO$_4$ | detergents |
| H$_3$PO$_4$ | K H$_2$PO$_4$ | fertilizers |
| H$_2$SO$_4$ | Na$_2$SO$_4$ | paper manufacture |
| H$_2$SO$_4$ | K$_2$SO$_4$ | fertilizers |
| HNO$_3$ | KNO$_3$ | fertilizers |

In all cases HCl is obtained as a useful co-product.

The list above by no means exhausts the possibilities that will occur to the industrial chemist. These will include many separations which are now difficult or costly. Thus for instance in the titanium pigment industry large quantities of FeSO$_4$ and free H$_2$SO$_4$ are obtained. In order to recover the free acid costly evaporation is needed at present. With the novel extractants the free acid can be recovered without resorting to evaporation.

It will be evident to those skilled in the art that the invention is not limited to the details of the foregoing illustrative embodiments and examples and that the present invention may be embodied in other specific forms without departing from the essential attributes thereof, and it is, therefore, desired that the present examples be considered in all respects as illustrative and not restrictive, reference being made to the appended claims, rather than to the foregoing description, and all changes which come with the meaning and range of equivalency of the claims are, therefore intended to be embraced therein.

What is claimed is:

1. A process for the separation of a strong mineral acid from other species present in an aqueous solution and the recovery thereof under reversible conditions which obviate the consumption of chemicals for regeneration comprising the steps of:
   (a) bringing an aqueous solution containing said mineral acid to be separated into contact with a substantially immiscible extractant phase, said extractant phase comprising:
      (1) a strong organic acid which acid is oil soluble and substantially water immiscible both in free and in salt form;
      (2) an oil soluble amine which amine is substantially water insoluble both in free and in salt form; and
      (3) a carrier solvent for said organic acid and said amine, wherein the molar ratio of said organic acid to said amine is between about 0.5:2 and 2:0.5,
   whereupon said predetermined mineral acid selectively and reversibly transfers to said extractant phase;
   (b) separating said two phases; and
   (c) backwashing said extractant phase with an aqueous system to recover substantially all the mineral acid contained in said extractant phase.

2. A process according to claim 1 wherein said strong organic acid is selected from the group consisting of aliphatic and aromatic sulfonic acids and alpha- beta- and gamma-chloro and bromo substituted carboxylic acids.

3. A process according to claim 1 wherein said amine is a primary, secondary or tertiary amine having at least 10 carbon atoms and at least one hydrophobic group.

4. A process according to claim 1 wherein the molar ratio of said organic acid to said amine is between about 0.5 to 1 and 1 to 0.5.

5. A process according to claim 2 wherein said organic acid is dinonylnaphthalene sulfonic acid (HDNNS).

6. A process according to claim 3 wherein said amine is a primary aliphatic amine in which the nitrogen atom is directly bonded to a tertiary carbon atom.

7. A process according to claim 3 wherein said amine is trilaurylamine (TLA).

8. A process according to claim 1 for the separation of strong mineral acids present in an aqueous solution from each other and the recovery thereof comprising the steps of:
   (a) bringing an aqueous solution containing said mineral acids to be separated into contact with a substantially immiscible extractant phase, said extractant phase comprising:
      (1) a strong organic acid which acid is oil soluble and substantially water immiscible both in free and salt form;
      (2) an oil soluble amine which amine is substantially water insoluble both in free and salt form; and
      (3) a carrier solvent for said organic acid and said amine, wherein the molar ratio of said organic acid to said amine is between about 0.5:2 and 2:0.5,
   whereupon a predetermined mineral acid selectively and reversibly transfers to said extractant phase;
   (b) separating said two phases; and
   (c) backwashing said extractant phase with an aqueous system to recover substantially all the mineral acid contained in said extractant phase.

9. A process according to claim 8 wherein a first mineral acid is separated from a second mineral acid by contacting an aqueous solution containing both of said acids with an extractant phase preferential with respect to the extraction of said first mineral acid and wherein said extractant phase is charged with said second mineral acid prior to effecting the separation, thereby achieving a high concentration of said second mineral acid in said aqueous solution.

10. A process according to claim 9 wherein said extractant phase is charged with said second mineral acid in the presence of a salt having a common anion with said second acid.

11. A process according to claim 8 wherein an aqueous solution, containing a mineral reagent acid of a reaction as well as a mineral product acid of said reaction, is brought into contact with said substantially immiscible extractant phase to effect the separation of said acids whereafter said separated reagent acid can optionally be recovered and recycled.

12. A process according to claim 8 wherein nitric acid is selectively extracted from an aqueous solution containing nitric acid and hydrochloric acid.

13. A process according to claim 10 for the recovery of $KNO_3$ from the reaction of $KCl$ and $HNO_3$ comprising contacting an aqueous filtrate of said reaction consisting essentially of nitric acid and hydrochloric acid with said extractant phase to selectively transfer said nitric acid to said extractant phase, separating said two phases and backwashing said extractant phase with an aqueous solution to recover for recycling substantially all of the originally extracted nitric acid.

14. A process according to claim 8 wherein hydrochloric acid is selectively extracted from an aqueous solution containing hydrochloric acid and sulfuric acid.

15. A process according to claim 8 wherein hydrochloric acid is selectively extracted from an aqueous solution containing hydrochloric acid and phosphoric acid.

16. A process for the separation and recovery of nitric acid from an aqueous solution thereof comprises contacting said solution with a homogeneous solution of tertiary trilaurylamine and dinonylnaphthalene sulfonic acid in xylene, the equivalent ratio of said amine and said acid being from 1:1 to 1:1.1, and recovering said nitric acid from the organic phase by contacting the latter with water.

17. The process of claim 16, wherein said homogeneous solution is replaced by a solution of didodecylnaphthalene sulfonic acid and tertiary trilaurylamine in xylene and n-dodecanol, the equivalent ratio of said amine and said acid being 0.18:0.2.

* * * * *